United States Patent
Loong et al.

(10) Patent No.: US 9,621,874 B2
(45) Date of Patent: Apr. 11, 2017

(54) MULTIPLE IMAGER CAMERA

(71) Applicant: DELPHI TECHNOLOGIES, INC., Troy, MI (US)

(72) Inventors: Daniel Leong Woon Loong, Singapore (SG); Kok Wee Yeo, Singapore (SG); Yew Kwang Low, Singapore (SG); Ronald M. Taylor, Greentown, IN (US); Thomas A. Degenkolb, Noblesville, IN (US); Ward K. Everly, Kokomo, IN (US); Morgan D. Murphy, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 301 days.

(21) Appl. No.: 14/472,910

(22) Filed: Aug. 29, 2014

(65) Prior Publication Data
US 2016/0065940 A1    Mar. 3, 2016

(51) Int. Cl.
*H04N 13/02* (2006.01)
*H04N 5/225* (2006.01)

(52) U.S. Cl.
CPC ....... *H04N 13/0207* (2013.01); *H04N 5/2253* (2013.01); *H04N 5/2258* (2013.01)

(58) Field of Classification Search
CPC ............. H04N 13/0207; H04N 5/2258; H04N 5/2253; H04N 13/0242
USPC .......................................................... 348/47
See application file for complete search history.

(56) References Cited

U.S. PATENT DOCUMENTS

| 4,591,901 A | 5/1986 | Andrevski | |
| 5,805,218 A * | 9/1998 | Ohura | H04N 5/2253 348/188 |
| 2009/0244302 A1* | 10/2009 | Tsai | G03B 5/00 348/208.99 |
| 2010/0020180 A1* | 1/2010 | Hill | H04N 5/2253 348/188 |
| 2010/0212825 A1* | 8/2010 | Hasegawa | G02B 7/00 156/275.5 |
| 2011/0103782 A1 | 5/2011 | Tsuruta et al. | |

FOREIGN PATENT DOCUMENTS

| EP | 1 522 888 A1 | 4/2005 |
| EP | 2 148 501 A2 | 1/2010 |

* cited by examiner

*Primary Examiner* — Andy Rao
*Assistant Examiner* — Jared Walker
(74) *Attorney, Agent, or Firm* — Lawrence D. Hazelton

(57) ABSTRACT

A multiple imager camera includes a block, an imager, and an alignment apparatus. The block is configured to direct an image to a plurality of imagers located proximate to a plurality of apertures defined by the block. The imager of the plurality of imagers is configured to receive the image through an aperture of the plurality of apertures. The alignment apparatus is interposed between the block and the imager. The alignment apparatus is configured to allow for six degrees of freedom to align the imager with the image. The six degrees of freedom include adjustment along a x-axis, a y-axis, and a z-axis of the aperture, and adjustment about a pitch-axis, a yaw-axis, and a roll-axis of the aperture. The alignment apparatus is further configured to fixedly couple the imager to the block after the imager is aligned with the image.

4 Claims, 5 Drawing Sheets

MULTIPLE IMAGER CAMERA

TECHNICAL FIELD OF INVENTION

This disclosure generally relates to a multiple imager camera, and more particularly relates to an alignment apparatus configured to fixedly locate the multiple imagers after each imager is aligned with an image received by the camera.

BACKGROUND OF INVENTION

Optical sensor systems are frequently used in automobiles and other vehicles to provide images of areas around the vehicle. In some instances, these images are used by various vehicle warning and control systems. In the example of forward looking optical sensor systems, the images provided by the sensor may be used as inputs for collision avoidance, lane departure detection, forward collision warning, side warning, adaptive cruise control, night vision, headlight control, rain sensing systems and others. Typically, a forward looking optical sensor system is located behind the windshield near the rear view mirror to obtain a view of the road ahead which is similar to the driver's view. Optical sensor systems may also be used to view the area behind a vehicle for backing up, trailer towing, rearward collision warning, and rear blind zone warning systems. Additionally, optical sensor systems may be used to determine occupant position for restraint systems, rear seat occupant monitoring, or security and intrusion detection systems.

The cost of individual sensor systems for each of these vehicle warning or control systems, plus the challenges of efficiently packaging multiple optical sensor systems in a vehicle make it desirable to use a single sensor system to provide images to multiple vehicle warning and control systems. Unfortunately, performance tradeoffs exist when using a single optical sensor system due to light sensitivity, spectrum sensitivity, and field of view requirements specific to each vehicle warning and control system. These performance tradeoffs have previously precluded optimum performance for every vehicle warning and control system.

For example, a night vision system may require an optical sensor system with high light sensitivity because of the need to sense contrast of objects at long ranges with very little active illumination. In contrast, a lane departure system may accommodate an optical sensor system with lower light sensitivity because daylight or headlights (at closer ranges) provide sufficient lighting.

Light sensitivity is primarily determined by the pixel size of the optoelectronic device used in the optical sensor system to convert light to an electrical signal; a larger pixel has more area available for photons to strike the pixel and be absorbed. As used herein, an optoelectronic device is a component of an optical sensor system that may be operable to generate a video signal. However, a larger pixel size requires a larger optoelectronic device for equivalent field of view. Light sensitivity for a given pixel size may be increased by increasing the exposure time. However, longer exposure time will decrease the frame rate of the images. Additionally, light sensitivity can be increased by using a larger aperture lens to allow more light to fall on the pixels of the sensor. However, a larger aperture usually requires a larger lens, which increases the packaging size of the optical sensor system.

Different vehicle warning and control systems may also require an optical sensor system with different spectrum sensitivity. For example a tail light detection system may require sensitivity to red light, a lane departure detection system may require sensitivity to yellow light, and a night vision system may require sensitivity to infrared light. There are performance tradeoffs that may be required if a single optical sensor system is used with all three of these vehicle warning and control systems.

Different vehicle warning and control systems may also require an optical sensor system with a different field of view. For example, a rain detection system may need a wide field of view while an adaptive cruise control system may need a narrower field of view. Again, using a single optical sensor system may require performance tradeoffs.

SUMMARY OF THE INVENTION

In accordance with one embodiment, a multiple imager camera is provided. The camera includes a block, an imager, and an alignment apparatus. The block is configured to direct an image to a plurality of imagers located proximate to a plurality of apertures defined by the block. The imager of the plurality of imagers is configured to receive the image through an aperture of the plurality of apertures. The alignment apparatus is interposed between the block and the imager. The alignment apparatus is configured to allow for six degrees of freedom to align the imager with the image. The six degrees of freedom include adjustment along a x-axis, a y-axis, and a z-axis of the aperture, and adjustment about a pitch-axis, a yaw-axis, and a roll-axis of the aperture. The alignment apparatus is further configured to fixedly couple the imager to the block after the imager is aligned with the image.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1A:
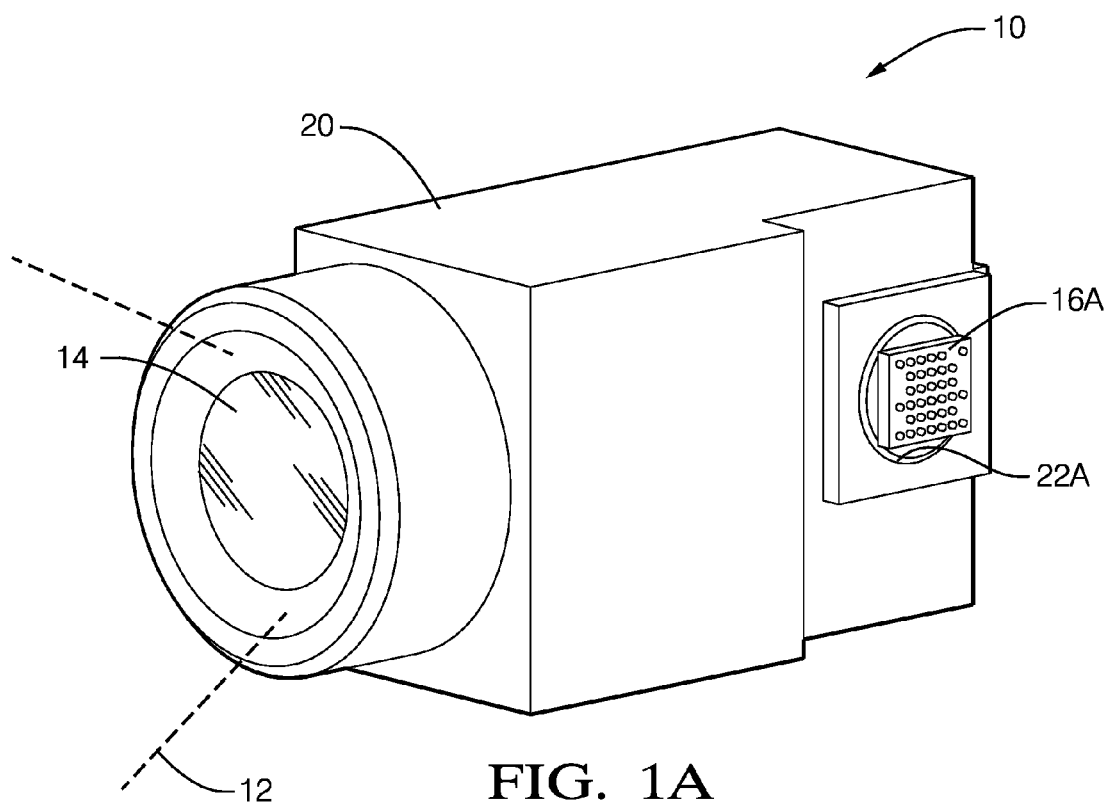
FIGS. 1A and 1B are isometric views from opposed perspectives of a multiple imager camera accordance with one embodiment.
Figure 1B:
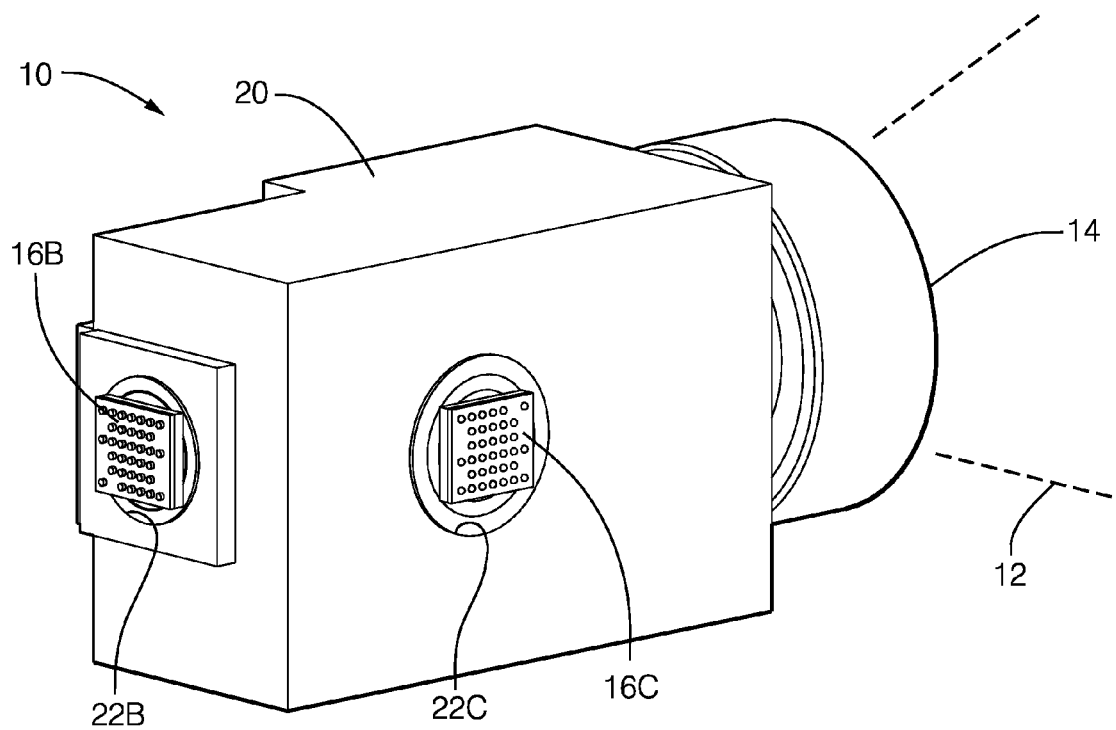

FIG. 1 illustrates a non-limiting example of a multiple imager camera, hereafter referred to as the camera 10. In general, the camera 10 is configured so that a variety of imagers (e.g. 16A, 16B, 16C) such as a visible light-imager, an infrared-light imager, and a low-resolution high-speed imager can capture images from a field of view 12 through a shared lens assembly, hereafter referred to as the lens 14. By arranging the plurality of imagers 16A, 16B, 16C to share the lens 14, costs can be reduced since each imager does not need a separate lens, and the overall size of a system that detects images at different wavelengths or at different resolutions can be reduced. If there is a desire to overlay or combine the images (i.e. combine video signals indicative of the images from each imager), it is desirable that the imagers are aligned with the image so that the images can be combined in a useful manner. As will be described in more detail below, the camera 10 described herein includes a means to readily align the various imagers with the image from the lens 14 and thereby avoid miss-matched images that my cause reduced clarity when the combined images are viewed by a person.

Figure 2:
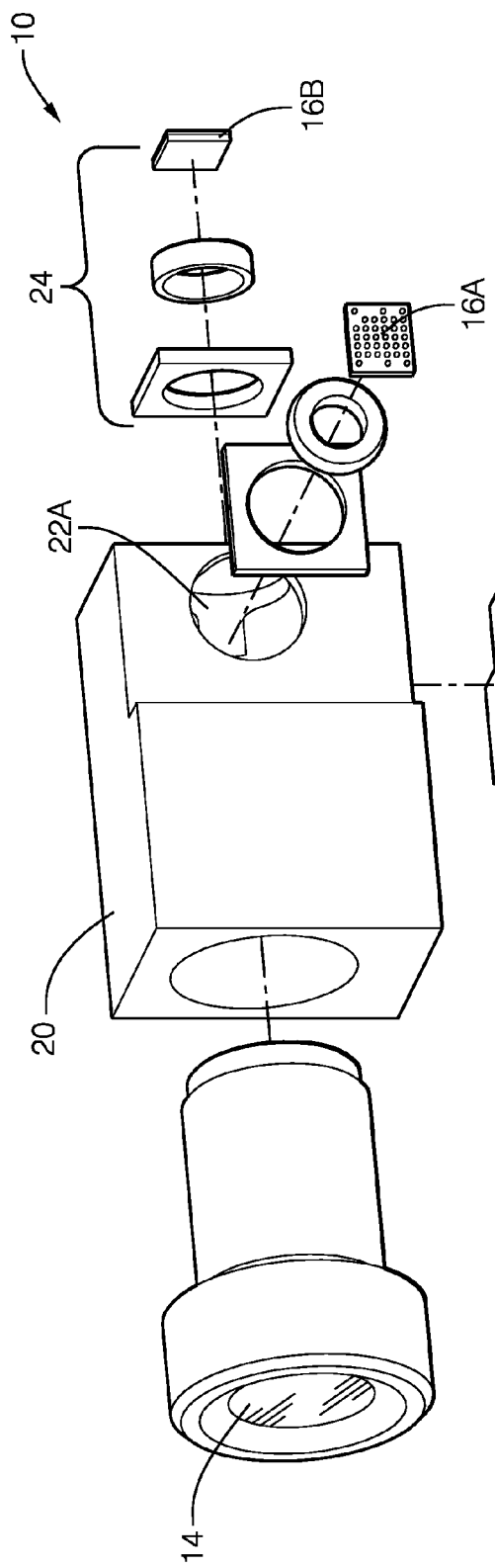
FIG. 2 is an exploded view of the camera of FIGS. 1A and 1B in accordance with one embodiment.

FIG. 2 further illustrates a non-limiting example of an exploded view of the camera 10. The camera includes a frame or a block 20 configured to, among other things, direct the image from the lens 14 to a plurality of imagers 16A, 16B, 16C that are located proximate to a plurality of apertures 22A, 22B, 22C defined by the block 20. While the non-limiting example described herein shows three imagers, cameras with two imagers or more than three imagers are contemplated.

Figure 3:
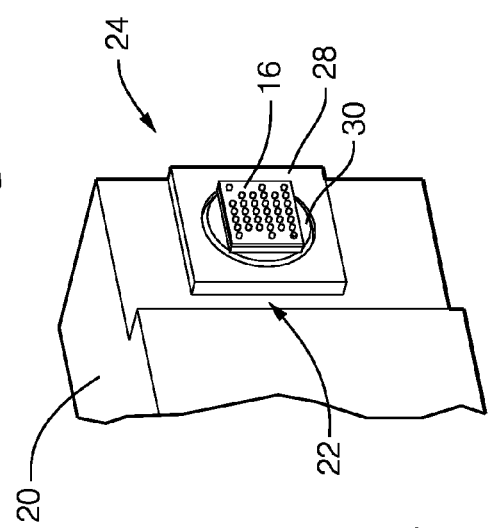
FIG. 3 is a close-up isometric view of an alignment apparatus for the camera of FIGS. 1A and 1B in accordance with one embodiment.

FIG. 3 shows a non-limiting generic example of an imager 16 which could be any of the plurality of imagers 16A, 16B, 16C. The imager 16 is configured to receive the image from the lens 14 through an aperture 22 which could be any of the plurality of apertures 22A, 22B, 22C. The aperture 22 is sized such that the imager 16 can be moved relative to the aperture 22 sufficiently to align the imager 16 with the image from the lens 14 and thereby compensate for any expected part-to-part variability of the various parts that make up the camera 10.

In order to align the imager 16 to the image from the lens 14, the camera 10 includes an alignment apparatus 24 interposed between the block 20 and the imager 16 proximate to the aperture 22. The alignment apparatus 24 is advantageously configured to allow for six degrees of freedom to align the imager 16 with the image. As will be recognized by those in the art, the six degrees of freedom include movement along three axis (e.g. x, y, z) and movement around those three axis (e.g. pitch, yaw, roll)

FIGS. 4A, 4B, 4C, 4D, 4E, and 4F illustrate each of the six degrees of freedom or adjustment which include adjustment along a x-axis 41, a y-axis 42, and a z-axis 43 of the aperture 22, and adjustment about a pitch-axis 44, a yaw-axis 45, and a roll-axis 46 of the aperture 22. Once an alignment process is completed (an example of an alignment process is presented below) the relative positions of the various imagers to the camera 10 need to be fixed or locked in place. Accordingly, the alignment apparatus 24 is further configured to fixedly couple the imager 16 to the block 20 after the imager 16 is aligned with the image. In other words, the imager 16 is locked in place so that it does not become miss-aligned after the alignment process has been completed. While the examples illustrated herein all suggest that each imager has a corresponding alignment apparatus, it is contemplated that one of the imagers (e.g. the imager 16B) could be attached or coupled to the block 20 in a non-adjustable manner, and the other imagers (e.g. the imager 16A and/or the imager 16B) could be adjusted relative to the fixed in place imager. However, in order to keep the adjustment process as flexible as possible, it is preferred that each imager is coupled to an adjustment means.

Referring again to FIG. 2, in order to distribute or direct the image from the lens 14 toward the plurality of apertures 22A, 22B, 22C, the camera 10 is equipped with a beam splitter 26 configured to direct the image to the plurality of apertures 22A, 22B, 22C. As used herein, the definition of the beam splitter 26 includes any means or devices suitable to direct an image from the lens 14 in multiple directions such as toward the plurality of apertures 22A, 22B, and 22C. By way of example and not limitation, the beam splitter may include one or more half-silvered mirrors as will be recognized by those in the art. If the camera 10 is equipped with only two imagers, then a single half-silvered mirror may be sufficient to split the image into two directions for the two imagers. If the camera 10 is equipped with three imagers, then two half-silvered mirrors may be required. It is recognized that it may be preferable if these mirrors are configured to reflect and allow to pass a ratio of light other than 50/50 to accommodate the light sensitivity characteristics of the various imagers. Alternatively, instead of passive beam splitters (e.g. half-silvered mirrors), the beam splitter 26 may incorporate one or more electrochromic mirrors that can be operated between a fully reflective state and a fully transmissive state, as will be recognized by those in the art.

Figure 4A:
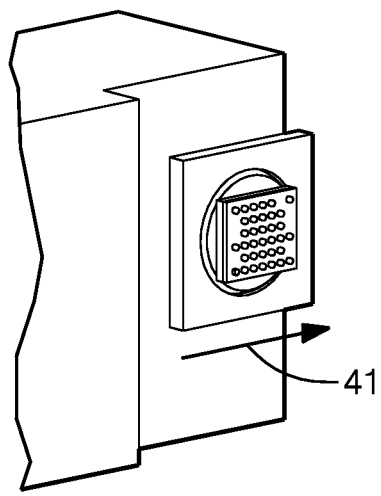
FIGS. 4A, 4B, 4C, 4D, 4E, and 4F are illustrations of the six degrees of freedom provided by the alignment apparatus of FIG. 3 in accordance with one embodiment.
Figure 4B:
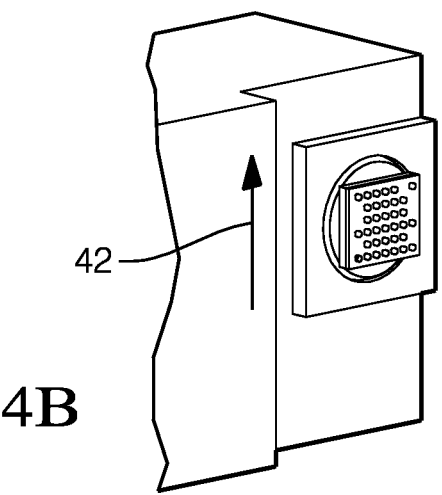
Figure 4C:
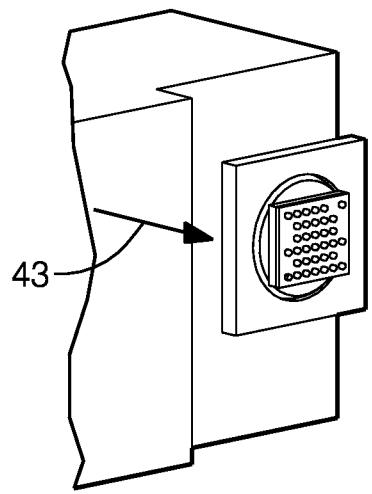
Figure 4D:
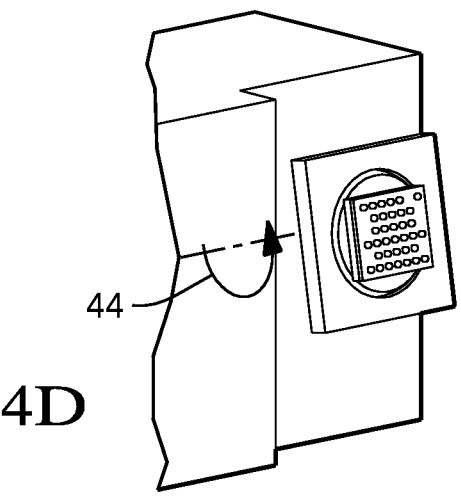
Figure 4E:
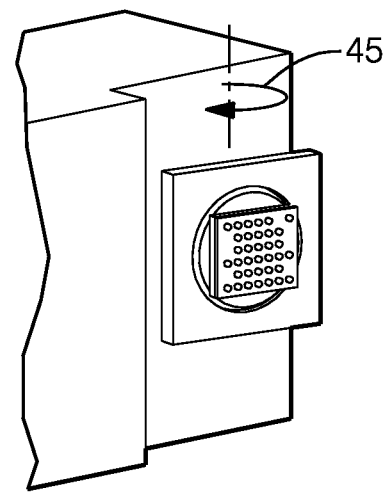

Referring again to FIG. 3, the non-limiting example of the alignment apparatus 24 includes an outer ring 28 coupled to the block 20. In general, the outer ring 28 is configured to allow for adjustment of the location of the imager 16 along the x-axis 41 (FIG. 4A) and the y-axis 42 (FIG. 4B). Once the alignment process is complete, i.e. the imager 16 is aligned with the image; the location of the outer ring 28 may be secured or fixed by, for example, curing an adhesive and/or heat staking. By way of further example and not limitation, an ultra-violet (UV) light curing initiated adhesive may be applied between the outer ring 28 and the block 20 prior to placing the outer ring 28 against the block 20. Then, after the alignment process is complete a UV light source may be used to cure the adhesive and thereby secure the outer ring 28 to the block 20. Alternatively, the adhesive may be a hot-melt type adhesive that hardens as it cools. The outer ring 28 may be held in place against the block 20 before the adhesive cures by spring loaded fingers (not shown) or some other fixture as will be recognized by those in the art.

Figure 4F:
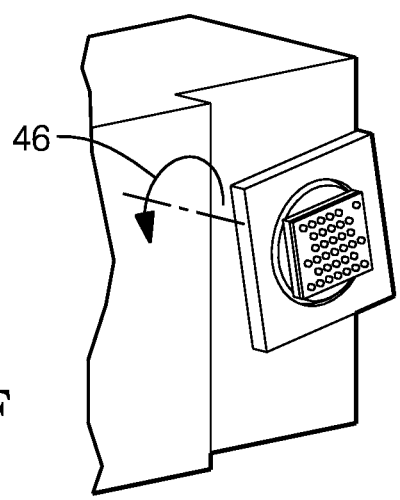

The non-limiting example of the alignment apparatus 24 shown in FIG. 3 and elsewhere also includes a hemispherical ring 30 coupled to the outer ring 28. In general, the hemispherical ring 30 is configured to allow for adjustment of the location of the imager 16 along the z-axis 43 (FIG. 4C) and the pitch-axis 44 (FIG. 4D), the yaw-axis 45 (FIG. 4E), and the roll-axis 46 (FIG. 4F). Similar to the outer ring 28, an ultra-violet (UV) light curing initiated adhesive may be applied between the hemispherical ring 30 and the outer ring 28 prior to inserting the outer ring 28 against the block 20. Then, after the alignment process is complete a UV light source may be used to cure the adhesive and thereby secure the hemispherical ring 30 to the outer ring 28. Preferably, the interface between the hemispherical ring 30 and the outer ring 28 is an interference type or friction type fit so that tooling used to position the imager 16 during the alignment process can release the imager once the alignment is complete.

Figure 5:
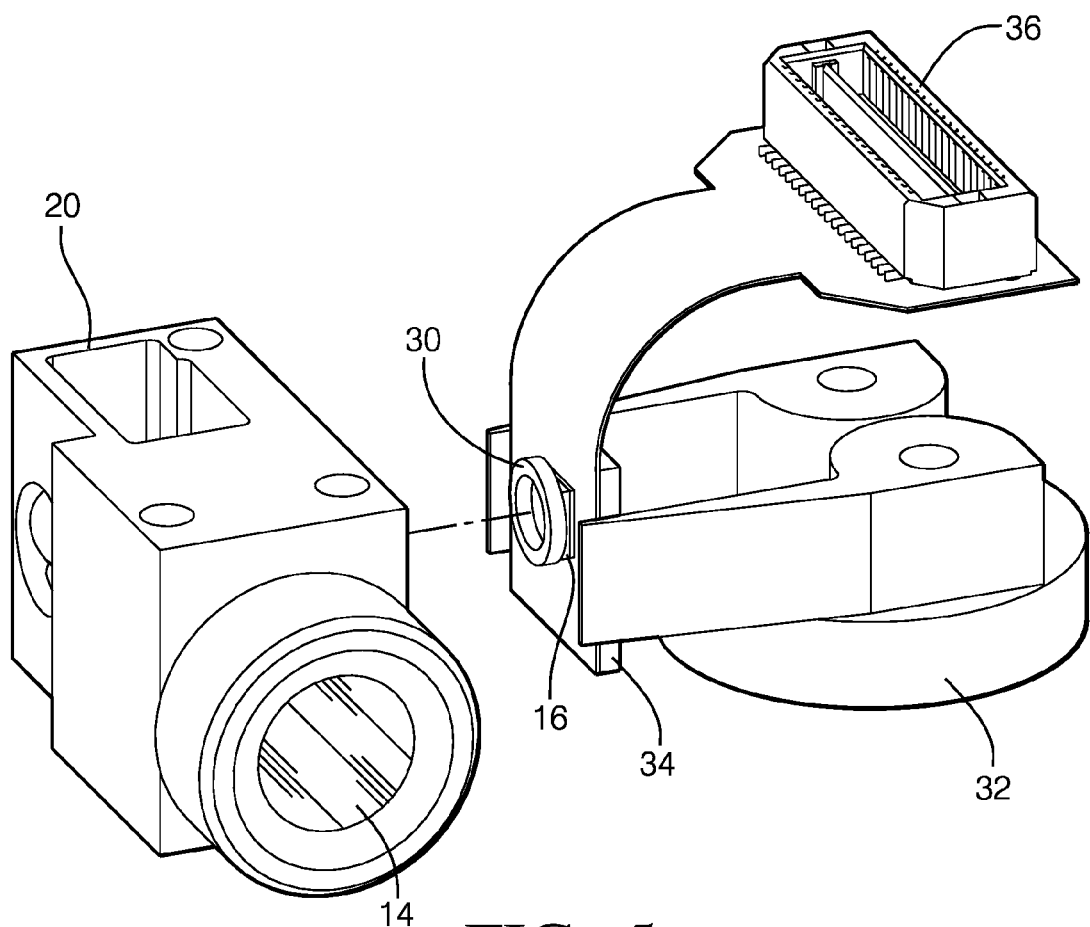
FIG. 5 is an isometric view of a tool for aligning the camera of FIGS. 1A and 1B in accordance with one embodiment.

FIG. 5 illustrates a non-limiting example of a tool 32 useful to position the imager 16 relative to the block 20 in order to align the imager 16 with the image from the lens 14. In this example, the imager is attached to a circuit board 34 that is electrically connected to a connector 36 so that images captured by the imager 16 can be monitored during the alignment process. While not shown, those in the art will recognize that the tool 32 may be attached to a robot arm or other position control apparatus effective to position or align the imager 16 with the image. In this example, the hemispherical ring 30 is fixedly attached to the imager 16 before the imager 16 is aligned with the image.

The outer ring 28 is not shown in FIG. 5, but it is contemplated that the outer ring 28 could be placed against the block 20 prior to bringing the imager 16 toward the block 20, or the outer ring 28 could be placed over the hemispherical ring 30 before bringing the imager 16 toward the block 20. In either case, it is preferable that the outer ring 28 is fixedly attached to the block 20 after the imager 16 is aligned with the image. Similarly, it is preferable that the hemispherical ring 30 is fixedly attached to the outer ring 28 after the imager 16 is aligned with the image.

The alignment process may include orienting the camera 10 so the field of view 12 is directed to a known object (not shown) has predetermined targets useful to determine the alignment of the imager 16 with the image of the object. For example, the object may be a wall with various targets painted on the wall so that a controller (not shown) connected to the connector 36 is able to determine the relative alignment of the imager 16. Alternatively, a laser may be used to project a beam of light upon one or more pixels of each imager in order to determine the relative alignment of each imager.

Figure 6:
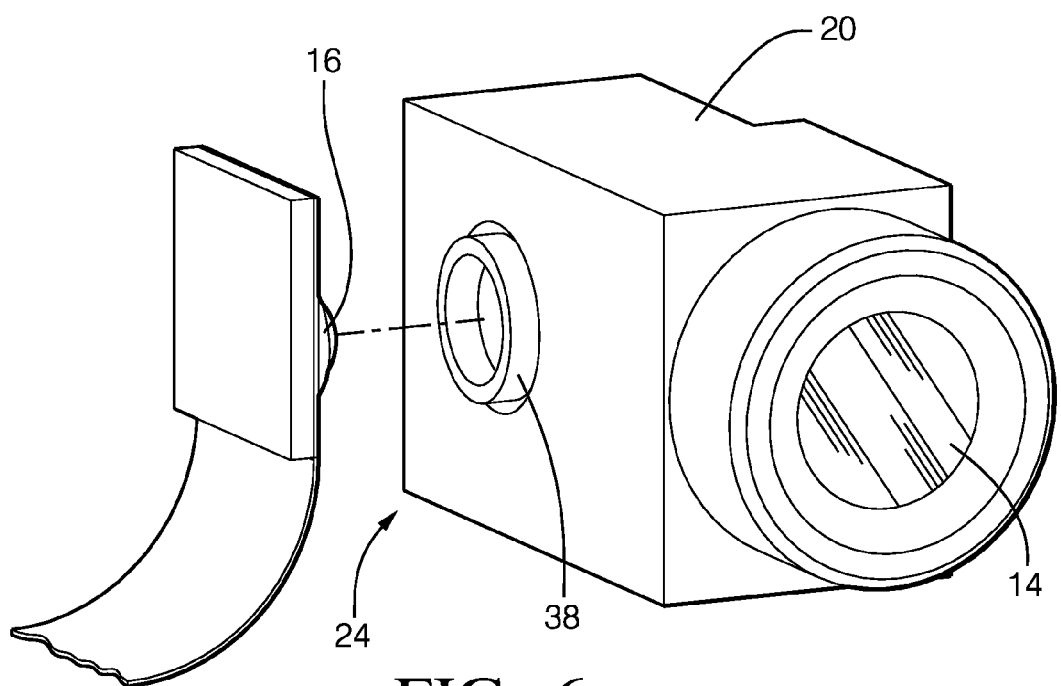
FIG. 6 is a close-up isometric view of an alternative alignment apparatus for the camera of FIGS. 1A and 1B in accordance with one embodiment.

FIG. 6 illustrates a non-limiting example of the alignment apparatus 24 that consists essentially of an arrangement of an adhesive 38 configured to allow the imager 16 to be aligned with the image from the lens 14 when the adhesive 38 is in an uncured state (i.e. semi-liquid or gel-like state), and fixedly attach the imager 16 to the block 20 when the adhesive 38 is in a cured state (i.e. solid or firm state). The advantage of this configuration is that it avoids having to provide the outer ring 28 and the hemispherical ring 30. A disadvantage is that the imager must be held in place while the adhesive cures. In contrast, if the hemispherical ring 30 has an interference type fit to the outer ring 28, that interference will allow the tool 32 to release the tool's grip on the imager assembly and the alignment will not be lost while waiting for any adhesive to cure.

Accordingly, a multiple imager camera (the camera 10) is provided. The camera 10 advantageously includes an alignment apparatus 24 that allows for various imagers (16A, 16B, 16C) to be aligned with an image passing through a shared lens (the lens 14). The camera is sometime referred to as a multi-core camera (MCC). The MCC described herein can be made highly compact, with multiple functions, and able to operate at visible and infra-red wavelengths. The cores or imagers can be used for imaging or non-image sensing (e.g. rain or light sensing). In addition to the alignment flexibility, the configuration also provides for precise focusing of the imagers to the lens. The independent alignment provides for the ability to focus the imagers to the lens independently, thereby allowing for variations in the back focal length of the lens 14 due to variations in wavelength, field of view, and/or imager field (size).

While this invention has been described in terms of the preferred embodiments thereof, it is not intended to be so limited, but rather only to the extent set forth in the claims that follow.

We claim:
1. A multiple imager camera comprising:
a block configured to direct an image in a plurality of directions to a plurality of imagers located at different locations on the block, each imager located proximate to one of a plurality of apertures defined by the block;
each imager of the plurality of imagers configured to receive the image through a different aperture of the plurality of apertures; and
a plurality of alignment apparatus, each alignment apparatus interposed between the block and an instance of the plurality of imagers, each alignment apparatus configured to allow for six degrees of freedom to align each imager with the image, wherein the six degrees of freedom include adjustment along a x-axis, a y-axis, and a z-axis of the aperture, and adjustment about a pitch-axis, a yaw-axis, and a roll-axis of the aperture, each alignment apparatus further configured to fixedly couple each imager to the block after each imager is aligned with the image, wherein each alignment apparatus includes
an outer ring coupled to the block and configured to allow for adjustment along the x-axis and the y-axis; and
a hemispherical ring coupled to an inner surface of the outer ring and configured to allow for adjustment between the hemispherical ring and the outer ring along the z-axis, and about the pitch-axis, about the yaw-axis, and about the roll-axis.

2. The camera in accordance with claim 1, wherein the camera includes a beam-splitter configured to direct the image to the plurality of apertures.

3. The camera in accordance with claim 1, wherein the hemispherical ring is fixedly attached to the imager before the imager is aligned with the image.

4. The camera in accordance with claim 1, wherein the alignment apparatus includes
an adhesive configured to allow the imager to be aligned with the image when the adhesive is in an uncured state, and fixedly attach the imager to the block when the adhesive is in a cured state.

* * * * *